United States Patent
Nielsen

Patent Number: 5,704,586
Date of Patent: Jan. 6, 1998

[54] APPARATUS FOR CONTROLLING A VALVE

[76] Inventor: Ole Cramer Nielsen, Asger Jorns Vej 18, DK-8600 Silkeborg, Denmark

[21] Appl. No.: 666,584
[22] PCT Filed: Dec. 21, 1994
[86] PCT No.: PCT/DK94/00481
 § 371 Date: Jul. 21, 1996
 § 102(e) Date: Jul. 21, 1996
[87] PCT Pub. No.: WO95/17624
 PCT Pub. Date: Jun. 29, 1995

[30] Foreign Application Priority Data

Dec. 21, 1993 [DK] Denmark ......................... 1425/93

[51] Int. Cl.$^6$ ............................................ F16K 31/02
[52] U.S. Cl. ................. 251/129.04; 137/554; 137/129.01
[58] Field of Search ........................... 137/554, 468, 137/552; 251/129.04, 129.01

[56] References Cited

U.S. PATENT DOCUMENTS

| | | | |
|---|---|---|---|
| 4,216,795 | 8/1980 | Cobb et al. | 137/554 |
| 4,342,331 | 8/1982 | Bartholomaus et al. | 137/554 |
| 4,706,703 | 11/1987 | Takeuchi et al. | 251/129.04 |
| 4,779,839 | 10/1988 | Sears | 251/129.04 |
| 4,825,901 | 5/1989 | Smith | 137/468 |
| 4,845,416 | 7/1989 | Scholl et al. | 251/129.04 |
| 5,056,046 | 10/1991 | Mutchler et al. | 251/129.01 |
| 5,109,675 | 5/1992 | Hwang | 251/129.04 |
| 5,231,469 | 7/1993 | Jeffers et al. | 251/129.01 |

FOREIGN PATENT DOCUMENTS

WO84/01445  4/1984  WIPO ......................... 137/554

Primary Examiner—Denise L. Ferensic
Assistant Examiner—Joanne Kim
Attorney, Agent, or Firm—Sixbey, Friedman, Leedom & Ferguson; David S. Safran

[57] ABSTRACT

Known position indicators for magnetic valves are switches which may be activated by cams on the moving parts. Following installation an individual adjustment has to be performed in order to obtain a precise acknowledgment. This disadvantage is avoided and a better monitoring of the functioning of the valve is obtained by detecting the position by means of a continuous position signaler where the data obtained from the putting into service are used as reference data at later determinations of extreme positions.

13 Claims, 1 Drawing Sheet

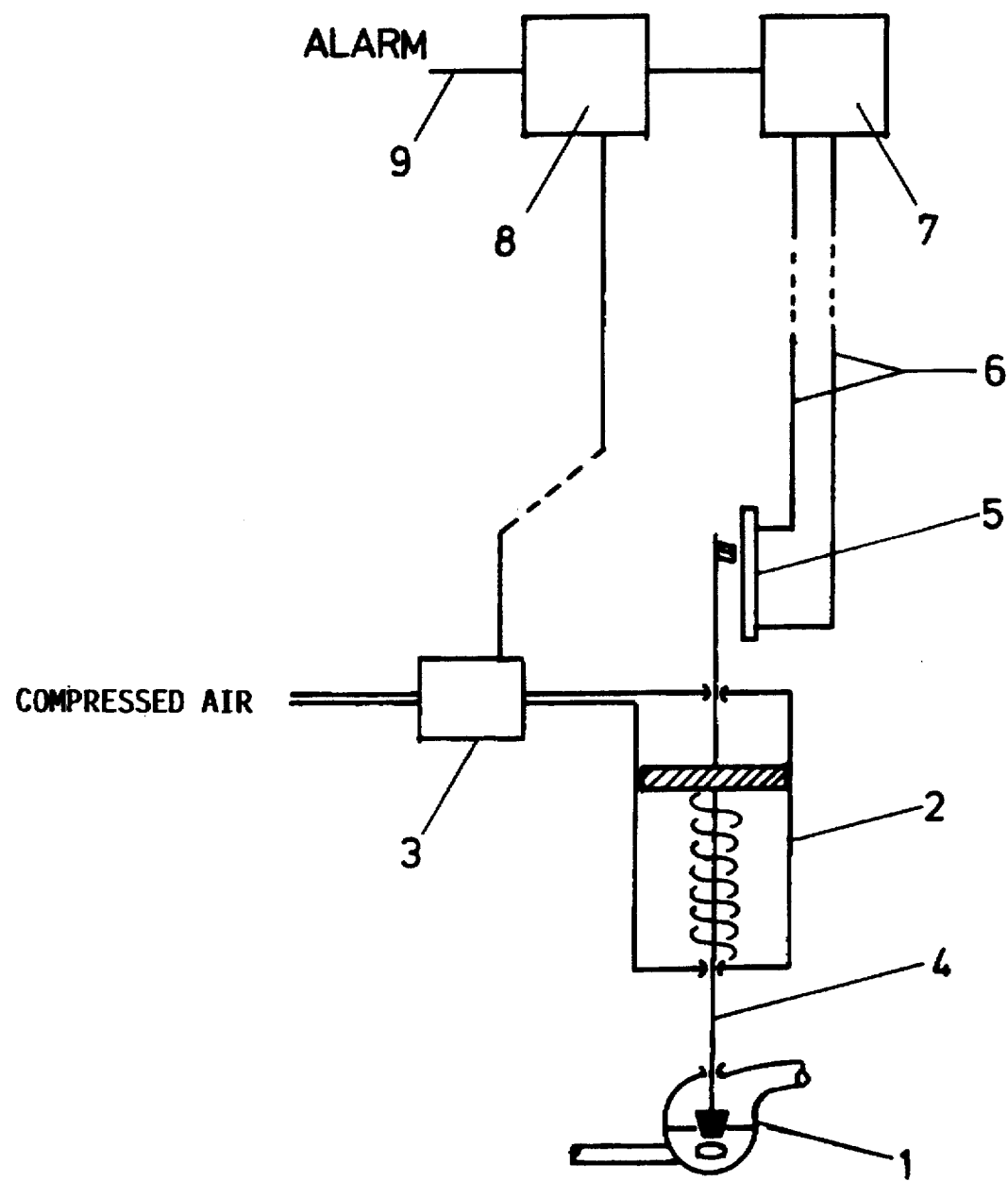

APPARATUS FOR CONTROLLING A VALVE

The invention relates to an apparatus for controlling a valve between a number of fixed positions of the type which comprises a magnetic valve which supplies an amount of fluid to a pressure cylinder which activates the valve.

In chemical industry it is usual to activate valves by means of pneumatic or hydraulic cylinders which are controlled by magnetic valves. Within certain industries there is a requirement for monitoring signals to allow determining that the valve has moved mechanically to the desired position so that it is either open or closed or has a desired position between these extremes. These signals are typically generated by microswitches which may be fitted so that they have a well-defined position at closed, open, or the desired position therebetween. In the case that a monitoring signal has to be given for "fully open" and "fully closed" two microswitches are used. Inductive sensors, possibly of the on/off type, may also be used. The purpose of the monitoring is to create a certainty that the valve has indeed been activated to the desired position. The requirement for the precision of the valve position may be in the order of magnitude of 0.1 mm, in particular if the system is also supposed to catch faults in the valve seat gasket or a totally missing valve seat gasket.

The present system is very difficult and time-consuming to adjust, since it consists in moving to or several microswitches upon activation to each position. Wear of the valve and the valve seat gasket require frequent adjustment. The mechanical construction requires instrument quality adjustment facilities. Valves which operate at changing temperatures similarly need different adjustments dependent on temperature, and in particular this problem has been difficult to solve until now.

It is the purpose of the invention to provide an apparatus which solves the desired tasks without the disadvantages mentioned. This is obtained in an apparatus according to the invention which is particular in that the valve stem is provided with a linear position indicator which gives a series of readings during the movement of the valve stem, of which the readings relating to the desired fixed position are stored in a data store during a first activation of the valve, whereby the result of subsequent activations of the valve is determined by comparing the instant reading with a stored reading for a desired fixed position. A position indicator may be e.g. of the type difference transformer which is non-contacting, or optical which is based on optically reading a coded rod. Thereby, instead of a manual adjustment of microswitches it is a question of determining position data corresponding to the desired positions and storing them as a future reference. Thus it is possible to let a calculating unit place an uncertainty interval around the position indication to be obtained, and similarly the determination of slow changes in the position indication for the fixed points developed during many activations of the valve in question may enable automatic compensation for wear and/or settling of the valve seat gasket. One may actually perform a statistical analysis of the position indication relating to the extreme position obtained, in order that slow drift is compensated or accepted while a sudden change causes an alarm. Furthermore the whole data stream of position indications can be monitored during an activation, in that a certain time is provided for the change from one position to another, and an instant report may be had in case the valve is not activated in a regular fashion.

Similarly it becomes possible to compensate by calculation the influence of temperature on the dimensions of the valve, in case the position monitor is fitted together with a temperature sensor.

In practice the whole monitoring system is cast into an insulating and sealing compound, and in this case one will use a non-contacting system. In this manner a very stable construction is obtained which has a much higher probability of error-free survival in the frequently aggressive environment in which the pressure cylinder activated valves discussed are used.

BRIEF DESCRIPTION OF THE DRAWINGS

The FIGURE shows a control system for monitoring position of a valve.

The invention will be described in detail with reference to the drawing which schematically shows a valve 1 which is activated by means of a pressure cylinder 2 which is supplied with air under pressure via a magnetic valve 3. In this case the pressure cylinder is single acting with a return spring, but it could equally well be double acting. The valve stem 4 is shown extended through the pressure cylinder, and it carries a non-contacting position indicator, on the output of which signals appear which represent the position of the valve stem, so that there is e.g. 1000 divisions within the travel of the valve stem. The signals are taken, e.g. via a twin lead field bus 6, to a data logger 7 which in conjunction with a control program in a monitoring and control unit 8 ascertains whether the command which was initiated by activating the magnetic valve 3 has in fact been carried out. In case the desired activation of the valve 1 does not occur correctly, an error signal appears on the output 9 on the monitoring and control unit 8.

I claim:

1. Apparatus for controlling movement of a valve between a number of fixed positions, comprising a pressure cylinder for activating the valve;

magnetic valve means for controlling a supply of fluid from a source of pressurized fluid to said pressure cylinder;

a valve having a valve stem;

a linear position indicator which is connected to said valve and provides position indications relating to fixed positions of the valve occurring during movement of the valve stem;

means for storing desired ones of said fixed position indications in a data store; and control means for comparing current position indications of said linear position indicator with fixed position indications stored in said data store;

wherein said control means has program means for determining, during repeated operation of the valve, the occurrence of changes in the position indications for the fixed positions of the valve and for compensating for such changes which are within a tolerance range around a stored position indication representative of correct operation of the valve.

2. An apparatus according to claim 1, wherein said program means has a controlling relationship with a calculating unit for providing said tolerance range.

3. An apparatus according to claim 2, wherein said calculating unit is a means for calculating an average value of a predetermined number of latest obtained and accepted position indications corresponding to a desired position for use as said stored position indication in subsequent position indication determinations.

4. An apparatus according to claim 3, further comprising means for generating an error message in response to the occurrence of changes in the position indications which are outside of said tolerance range.

5. An apparatus according to claim 1, further comprising means for determining a time function for obtaining of incremental data from the linear position indicator and for producing an error message when the time function determination is below a stored reference value.

6. An apparatus according to claim 4, further comprising a temperature sensor positioned in association with the valve for providing temperature data to the calculating unit; wherein said calculating unit includes means for providing temperature compensation of said position indications on the basis of said temperature data.

7. An apparatus according to claim 6, wherein said control means is located at a distance from the valve and is connected thereto by a twin lead field bus.

8. An apparatus according to claim 1, wherein the linear position indicator is an optical position indicator.

9. An apparatus according to claim 8, wherein said optical position indicator is operable on the basis of a coded scale.

10. An apparatus according to claim 1, wherein the linear position indicator comprises a difference transformer.

11. An apparatus according to claim 1, wherein the linear position indicator is cast into an insulating and sealing compound which firmly and fluid-sealingly connects the position indicator to the valve.

12. An apparatus according to claim 1, further comprising means for generating an error message in response to the occurrence of changes in the position indications which are outside of said tolerance range.

13. An apparatus according to claim 1, wherein said control means is located at a distance from the valve and is connected thereto by a twin lead field bus.

* * * * *